United States Patent
Masuda (10) Patent No.: US 11,420,604 B2
(45) Date of Patent: Aug. 23, 2022

(54) ELECTRIC BRAKE DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 528 days.

(21) Appl. No.: 15/342,611

(22) Filed: Nov. 3, 2016

(65) Prior Publication Data
US 2017/0072931 A1    Mar. 16, 2017

Related U.S. Application Data

(63) Continuation of application No. PCT/JP2015/063181, filed on May 7, 2015.

(30) Foreign Application Priority Data

May 14, 2014   (JP) .............................. JP2014-100290

(51) Int. Cl.
*B60T 13/74* (2006.01)
*B60T 8/17* (2006.01)
(Continued)

(52) U.S. Cl.
CPC .............. *B60T 13/741* (2013.01); *B60T 8/00* (2013.01); *B60T 8/17* (2013.01); *B60T 8/58* (2013.01);
(Continued)

(58) Field of Classification Search
CPC .......... B60T 8/17; B60T 8/171; B60T 13/741; B60T 13/74; B60T 13/746; B60T 17/18;
(Continued)

(56) References Cited

U.S. PATENT DOCUMENTS

| 4,860,859 A | 8/1989 | Yamatoh et al. |
| 6,199,670 B1 | 3/2001 | Shirai et al. |

(Continued)

FOREIGN PATENT DOCUMENTS

| CN | 102242785 A | 11/2011 |
| CN | 104024065 A | 9/2014 |

(Continued)

OTHER PUBLICATIONS

International Preliminary Report on Patentability dated Nov. 24, 2016 in corresponding International Patent Application No. PCT/JP2015/063181.

(Continued)

*Primary Examiner* — Robert A. Siconolfi
*Assistant Examiner* — Stephen M Bowes (57) ABSTRACT

A brake controller is provided with a positive efficiency operation limiter configured to provide a time for maintaining or decreasing a torque to be generated by a motor, such that a braking force generated by pressing between a brake rotor and friction pads does not decrease, while a braking force command value outputted from a braking force command section increases. For example, the limiter limits a ratio of a time for increasing the braking force, relative to a sum of the time for increasing the braking force and the time for maintaining or decreasing the braking force, to a predetermined value or less.

7 Claims, 5 Drawing Sheets

(51) Int. Cl.
  *F16D 65/18* (2006.01)
  *B60T 8/00* (2006.01)
  *F16D 66/00* (2006.01)
  *B60T 8/58* (2006.01)
  *F16D 121/24* (2012.01)

(52) U.S. Cl.
  CPC .............. *B60T 13/74* (2013.01); *F16D 65/18* (2013.01); *F16D 66/00* (2013.01); *F16D 2121/24* (2013.01)

(58) Field of Classification Search
  CPC .... B60T 17/221; F16D 55/225; F16D 55/226; F16D 65/18; F16D 65/183; F16D 2121/24; F16D 2066/001
  See application file for complete search history.

(56) References Cited

U.S. PATENT DOCUMENTS

| | | | |
|---|---|---|---|
| 6,680,595 B2 | 1/2004 | Ito | |
| 6,851,765 B1* | 2/2005 | Disser | B60T 13/741 303/122.03 |
| 7,770,658 B2 | 8/2010 | Ito et al. | |
| 7,810,616 B2 | 10/2010 | Nakazeki | |
| 8,111,027 B2* | 2/2012 | Nakayama | H02P 6/34 318/400.01 |
| 8,733,512 B2 | 5/2014 | Kim | |
| 8,958,966 B2 | 2/2015 | Nohira et al. | |
| 9,475,471 B2 | 10/2016 | Yasui et al. | |
| 2003/0090227 A1 | 5/2003 | Ito | |
| 2004/0026989 A1 | 2/2004 | Suzuki et al. | |
| 2008/0091326 A1* | 4/2008 | Watanabe | B60T 13/741 701/70 |
| 2008/0110704 A1 | 5/2008 | Nakazeki | |
| 2009/0014192 A1 | 1/2009 | Ito et al. | |
| 2011/0278107 A1 | 11/2011 | Kim | |
| 2014/0200784 A1* | 7/2014 | Nohira | B60T 8/885 701/70 |
| 2015/0151727 A1 | 6/2015 | Yasui et al. | |
| 2016/0052496 A1* | 2/2016 | Seto | B60T 8/17 188/72.1 |

FOREIGN PATENT DOCUMENTS

| | | |
|---|---|---|
| DE | 198 41 170 C1 | 2/2000 |
| EP | 0 296 703 A1 | 12/1988 |
| JP | 6-64518 | 3/1994 |
| JP | 6-327190 | 11/1994 |
| JP | 11-236936 | 8/1999 |
| JP | 2002-001676 | 1/2002 |
| JP | 2002-67909 | 3/2002 |
| JP | 2002-104169 A | 4/2002 |
| JP | 2003083373 A * | 3/2003 |
| JP | 2004-122838 | 4/2004 |
| JP | 2006-194356 | 7/2006 |
| JP | 2006-315125 | 11/2006 |
| JP | 2007143311 A * | 6/2007 |
| JP | 2009247205 A * | 10/2009 |
| WO | 2013/047735 A1 | 4/2013 |

OTHER PUBLICATIONS

Extended European Search Report dated Nov. 27, 2017 in corresponding European Patent Application No. 15792738.5.
Office Action dated May 22, 2018 in corresponding Chinese Patent Application No. 201580024693.0, 10 pgs.
Extended Search Report dated Mar. 4, 2019 in European Patent Application No. 18 208 454.1.
International Search Report dated Jul. 7, 2015 in corresponding International Application No. PCT/JP2015/063181.
Office Action dated Mar. 12, 2019 in related Japanese Patent Application No. 2018-41973 (3 pages).
Office Action dated Dec. 31, 2020, in Chinese Patent Application No. 201910007043.5 (9 pages including machine translation).

* cited by examiner

ELECTRIC BRAKE DEVICE

CROSS REFERENCE TO THE RELATED APPLICATION

This application is a continuation application, under 35 U.S.C. § 111(a), of international application No. PCT/JP2015/063181, filed May 7, 2015, which is based on and claims Convention priority to Japanese patent application No. 2014-100290, filed May 14, 2014, the entire disclosure of which is herein incorporated by reference as a part of this application.

BACKGROUND OF THE INVENTION

Field of the Invention

The present invention relates to an electric brake device provided in an automobile.

Description of Related Art

Hitherto, an electric brake actuator using an electric motor, a linear motion mechanism, and a reducer or reduction gear has been proposed (e.g., Patent Document 1). In addition to this, an electric brake that performs deceleration and change into a linear motion with a planetary roller mechanism has also been proposed (Patent Document 2). A method for using reverse efficiency of an actuator to supply minimum power required for maintaining a clamping force of a friction pad has been proposed (Patent Document 3), although a device for this method targets a general machine, not an electric brake.

RELATED DOCUMENT

Patent Document

[Patent Document 1] JP Laid-Open Patent Publication No. H06-327190
[Patent Document 2] JP Laid-Open Patent Publication No. 2006-194356
[Patent Document 3] DE Patent No. 19841170 C1

SUMMARY OF THE INVENTION

In the electric brake devices in Patent Documents 1 and 2, etc., generally, a major part of power consumption is copper loss caused by a motor current, and a reduction in the motor current leads to a reduction in the power consumption. However, in Patent Documents 1 and 2, no consideration is taken for reducing the motor current to reduce the power consumption.

The method in Patent Document 3 is a method for supplying minimum power required for maintaining the clamping force, and leads to a reduction in power consumption. However, for example, in the case of gently increasing a braking force, an operation based on positive efficiency of the actuator has to be always performed. Thus, assumption of power consumption at the stage of design is difficult.

Figure 5:
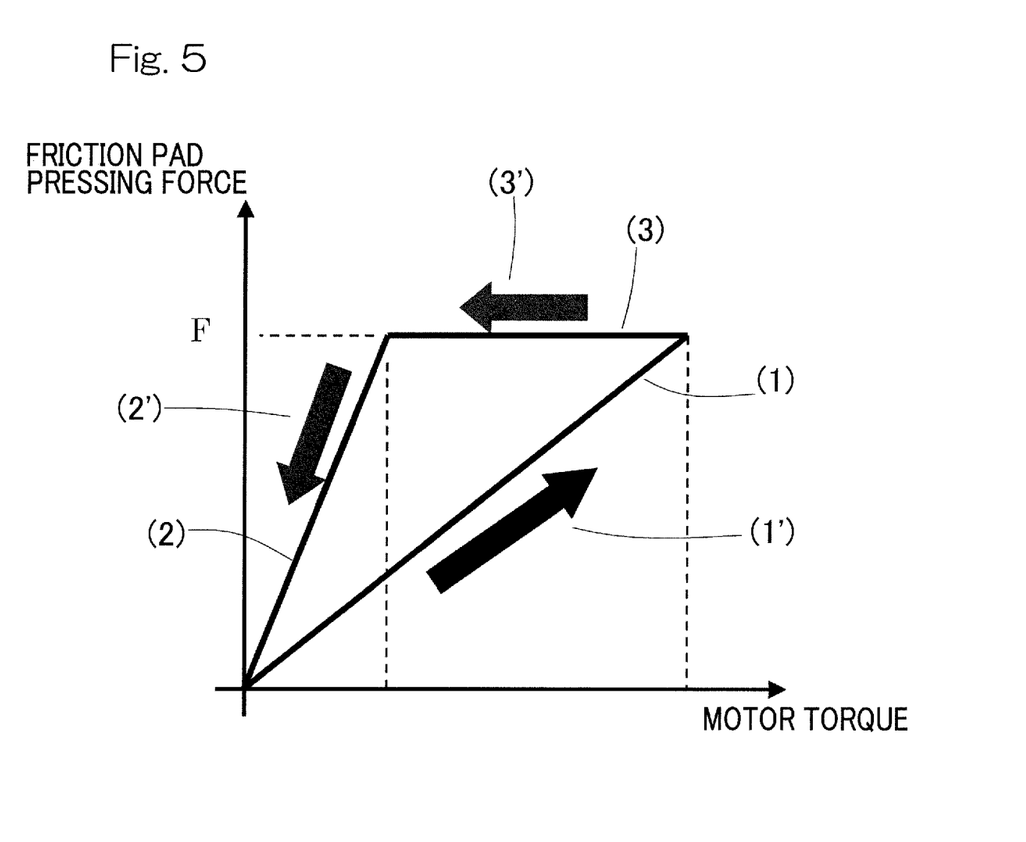
FIG. 5 is a graph showing a positive efficiency line and a reverse efficiency line in an electric brake device.

FIG. 5 shows a correlation between a torque of an electric motor and a friction pad pressing force exerted by an electric brake device. As the motor torque increases, the pressing force of the electric brake device increases according to a straight line (1) in FIG. 5, indicating positive efficiency (an arrow (1')). After this operation, when the motor torque turns to decrease, the pressing force of the electric brake device decreases according to a straight line (2) in FIG. 5, indicating reverse efficiency (an arrow (2')). During the above operation, non-linear hysteresis characteristics are shown in which, as shown by an arrow in FIG. 5, even when the motor torque decreases from a predetermined pressing force state, the state shifts according to a straight line (3) (an arrow (3')) and in which the pressing force does not change until reaching a motor torque on the straight line (2).

In the power consumption of the electric brake device, the proportion of copper loss caused by a motor current is relatively high. At this time, the copper loss is proportional to the square of the current, and thus is roughly proportional to the square of the motor torque. That is, the power consumption is high when an operation is performed along the straight line (1), which is a positive efficiency line, and the power consumption is low when an operation is performed along the straight line (2), which is a reverse efficiency line.

The present invention provides an electric brake device that solves the above problems, that decreases a current by using a frictional force to maintain a pressing force, thereby allowing power consumption to be reduced by a reduction in loss caused by conductor resistance, and that suppresses heat generation of a motor by a reduction in a motor current, thereby enabling improvement of the reliability and size reduction of the motor.

Hereinafter, in order to facilitate understanding of the present invention, the present invention will be described with reference to the reference numerals in embodiments for the sake of convenience.

An electric brake device according to the present invention includes: a brake rotor 4 configured to rotate in conjunction with a wheel 3; a friction pad 6 configured to come into contact with the brake rotor 4 to generate a braking force; an electric motor 7; a conversion mechanism 9 configured to convert an output of the motor 7 into a pressing force of the friction pad 6; a braking force command section 12 configured to output a braking force command value that is a target value; and a brake controller 2 configured to drive the motor 7 in accordance with the braking force command value, wherein the brake controller 2 is provided with a positive efficiency operation limiter 22 configured to provide a time for maintaining or decreasing a torque to be generated by the motor 7, according to a determined condition such that a braking force generated by pressing between the brake rotor 4 and the friction pad 6 does not decrease, while the braking force command value outputted from the braking force command section 12 increases.

The relationship between the motor torque and the pressing force of the friction pad 6 in the electric brake device differs between a positive efficiency line when the pressing force increases and a reverse efficiency line when the pressing force decreases, due to the frictional force at each portion, and the pressing force does not change during transition from the positive efficiency line to the reverse efficiency line even when the motor torque decreases as described above. The present invention effectively utilizes the above characteristics, and by control of the positive efficiency operation limiter 22, the time for maintaining or decreasing the torque to be generated by the motor 7 is provided according to the determined condition such that a braking force generated by pressing between the brake rotor 4 and the friction pad 6 does not decrease, while the braking force command value increases. By using the frictional force to maintain the pressing force as described above, the time for maintaining or decreasing the torque to be generated by the motor 7 is provided such that the generated braking force does not decrease. Thus, due to the time, a reduction in the motor current due to the reduction of the torque is obtained without decreasing the braking force. In addition, motor heat generation is suppressed by the reduction in the motor current, so that improvement of the reliability and size reduction of the motor 7 are enabled.

In the present invention, the determined condition in the positive efficiency operation limiter 22 may be limiting a ratio of a time for increasing the braking force, relative to a sum of the time for increasing the braking force and the time for maintaining or decreasing the braking force, to a predetermined value or less. Defining the ratio of the time for increasing the braking force, relative to the sum, is synonymous with defining the ratio between the time for increasing the braking force and the time for maintaining or decreasing the braking force, although the magnitudes of these ratios are different from each other. When the ratio of the time for increasing the braking force is limited to the predetermined value or less as described above, control in which the time for increasing the braking force is limited such that the braking force does not decrease, can be easily performed.

In the case of this configuration, the positive efficiency operation limiter 22 may count an output time during which the braking force command value is outputted from the braking force command section 12, and may limit the ratio of the time for increasing the braking force relative to the sum, to the predetermined value or less in accordance with the count value. Regarding control in which a current is applied to the motor in accordance with the braking force command value outputted from the braking force command section 12, generally, control in which the braking force command value is read and subjected to predetermined processing and a current is applied to the motor 7 is repeatedly performed at regular intervals. Thus, by performing a process of counting the output time during which the braking force command value is outputted from the braking force command section 12 and a process of limiting the ratio of the time for increasing the braking force to the predetermined value or less in accordance with the count value, control in which the ratio of the time for increasing the braking force relative to the sum is limited to the predetermined value or less can be easily implemented. In the case of this control, particularly, means configured to estimate or detect the motor current or the pressing force is also not needed.

In the electric brake device, the positive efficiency operation limiter 22 may compare a motor current with a positive efficiency current for maintaining a present braking force, may count a time during which the motor current is larger than the positive efficiency current, and may limit the ratio of the time for increasing the braking force relative to the sum, to the predetermined value or less in accordance with the count value. The motor current may be a current value calculated in accordance with the braking force command value provided from the braking force command section 12, or may be a value of a current actually flowing through the motor 7 measured by a motor current detector 28. Also by comparing the motor current with the positive efficiency current for maintaining the present braking force as described above, control in which the ratio of the time for increasing the braking force is limited to the predetermined value or less can be performed. In this case, since the motor current is used in the comparison, control with high reliability can be performed.

In the present invention, since the time during which the braking force is not increased is provided while the braking force command value is outputted from the braking force command section 12 as described above, there is a possibility that the operation feeling of an operator of a vehicle deteriorates. Thus, one or more of the following section or the like may be included.

For example, a light braking-time non-execution section 25 configured to execute the positive efficiency operation limiter 22 only when the braking force command value outputted by the braking force command section 12 is equal to or greater than a predetermined value, may be provided. It is thought that positive efficiency operation limitation becomes more effective as the braking force, that is, the pad pressing force, increases, and, in general, influence on deterioration of the feeling of the operator becomes smaller as deceleration of the vehicle increases. Thus, both desired power consumption and desired feeling can be achieved by executing the positive efficiency operation limitation only when a requested braking force is equal to or greater than the predetermined value.

The positive efficiency operation limiter 22 may include a braking force-corresponding limitation degree change section 23 configured to decrease a ratio of a time for increasing the braking force relative to a sum of the time for increasing the braking force and the time for maintaining or decreasing the braking force, as the braking force increases. In this case, both desired power consumption and desired feeling can be achieved more favorably.

In the above, a motor temperature estimation section 29 configured to estimate or measure a temperature of the motor 7 may be provided, and a motor temperature-corresponding execution section 26 configured to execute the positive efficiency operation limiter 22 when the temperature of the motor becomes equal to or higher than a predetermined value, may be provided. In the case of this configuration, feeling is prioritized when the temperature of the motor 7 is low, and power consumption is reduced, that is, motor heat generation is suppressed, as the temperature increases. In general, in the case where motor copper loss is raised as a problem as to power consumption of the vehicle, it is thought that corresponding loss occurs in the motor to generate heat. Thus, also in this method, both desired power consumption and desired feeling can be achieved.

In the case of this configuration, the positive efficiency operation limiter 22 may be provided with a temperature-corresponding limitation degree change section 24 configured to decrease a ratio of a time for increasing the braking force relative to a sum of the time for increasing the braking force and the time for maintaining or decreasing the braking force, as the temperature of the motor increases. Thus, both desired power consumption and desired feeling can be achieved further favorably.

In the above, the electric brake device may include a vehicle speed estimation section 30 configured to estimate or measure a vehicle speed of a vehicle equipped with the electric brake device, and a vehicle speed-corresponding execution section 27 configured to cause a control by the positive efficiency operation limiter 22 to be performed only when the vehicle speed estimated or measured by the vehicle speed estimation section 30 is equal to or lower than a constant value, may be provided. As described above, the positive efficiency operation limitation may be executed only when the speed of the vehicle is equal to or lower than the predetermined value. Particularly when the vehicle has stopped or is at stoppage, the above feeling deterioration does not occur.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
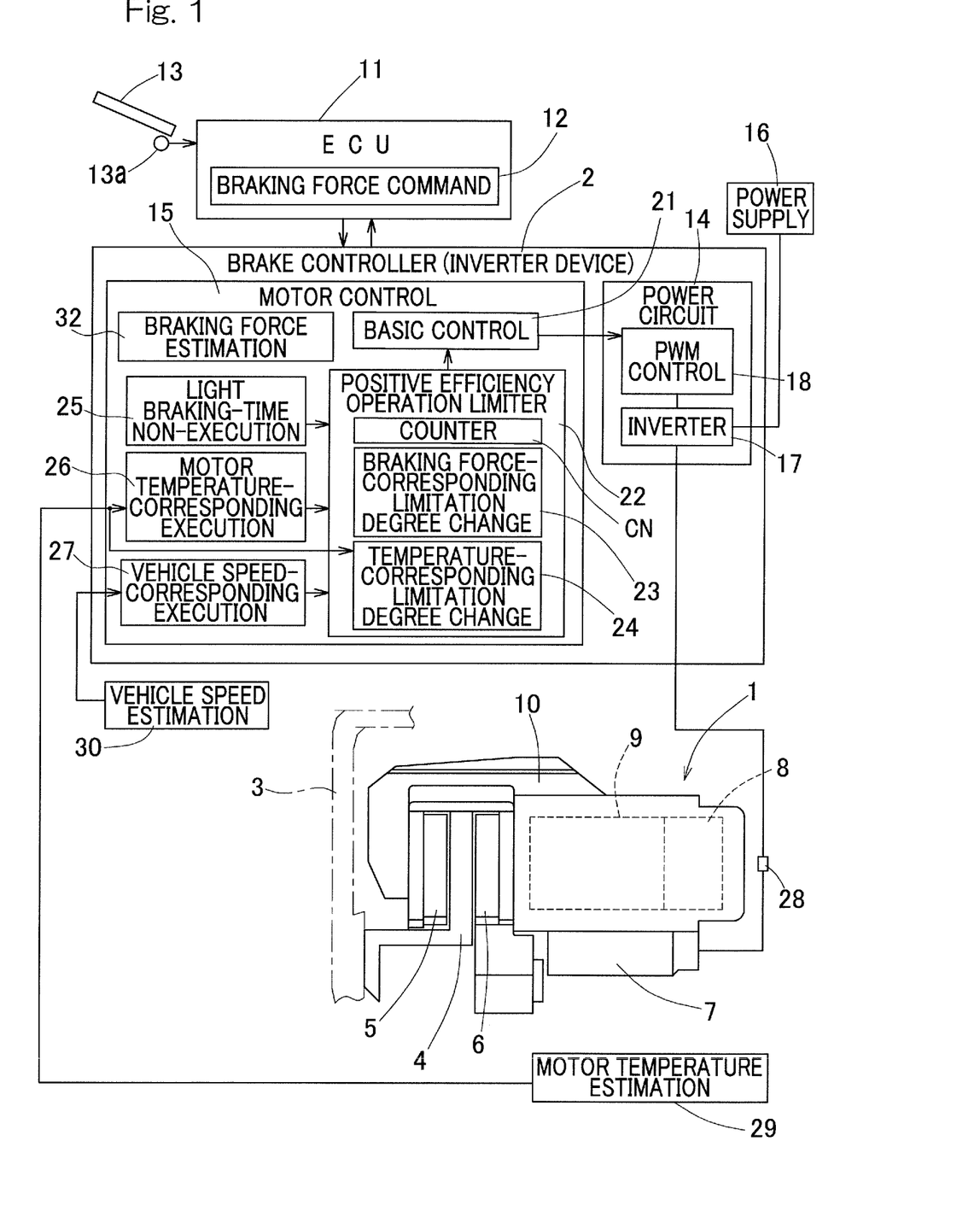
FIG. 1 is a block diagram showing a conceptual configuration of an electric brake device according to an embodiment of the present invention.

An electric brake device according to an embodiment of the present invention will be described with reference to the drawings. As shown in FIG. 1, the electric brake device includes: a brake main body 1 that is a mechanical part; and a brake controller 2 that controls the brake main body 1.

The brake main body 1 includes: a brake rotor 4 that rotates in conjunction with a wheel 3; fixed-side and movable-side friction pads 5 and 6 that come into contact with both surfaces of the brake rotor 4, respectively, to generate a braking force; an electric motor 7; a speed reduction mechanism 8 that reduces a speed of rotation (or number of rotation per unit time) of the motor 7; and a conversion mechanism 9 that converts an output of the speed reduction mechanism 8 into a pressing force of the movable-side friction pad 6. The motor 7 is provided with rotation angle detector (not shown) that detects a rotation angle. The brake rotor 4 is mounted on a hub (not shown) so as to be integrated with the wheel 3. The motor 7 and the fixed-side friction pad 5 are installed on a housing 10 that is a caliper, and the speed reduction mechanism 8 and the conversion mechanism 9 are incorporated into the housing 10. The conversion mechanism 9 is composed of a feed screw mechanism and converts a rotational output of the speed reduction mechanism 8 into a linear reciprocating movement of the movable-side friction pad 6.

In the present embodiment, the brake controller 2 is an inverter device or the like provided independently of a main electronic control unit (ECU) 11 that performs control of the entirety of a vehicle. The main ECU 11 is provided with braking force command section 12 that outputs a braking force command value that is a target value. In response to a detection signal of a sensor 13a that detects an operation amount of brake operation portion 13 such as a brake pedal, the braking force command section 12 generates the braking force command value by using a look up table (LUT) implemented by software or hardware and a predetermined transform function contained in a library of software, or hardware equivalent to those, etc., and outputs the braking force command value to the brake controller 2. The brake operation portion 13 is not limited to a pedal input manner, and may be a button input manner or a lever input manner as long as it is used by an operator to provide an instruction to apply a brake.

The brake controller 2 includes: a power circuit section 14 that applies a driving current to the motor 7 of the brake main body 1; and a motor control section 15 that is an electronic circuit portion that controls the motor 7 by performing current control or the like of the power circuit section 14.

The power circuit section 14 includes: an inverter 17 that converts DC power from a power supply 16 composed of a battery or the like into AC power; and a PWM control section 18 that performs current control of the inverter 17 through a pulse width modulation control or the like.

The motor control section 15 is an electronic control unit (ECU) dedicated for braking and is composed of: a computer including a processor; and other electronic circuits such as a read only memory (ROM) including a program to be executed by the processor, a random access memory (RAM), and a co-processor. The motor control section 15 includes basic control section 21. The basic control section 21 generates a current command value for controlling the current of the motor 7 in accordance with the braking force command value outputted from the braking force command section 12 and sends the command to the power circuit section 14. The basic control section 21 has a function to perform feedback control or the like by using a detection value of a current detector 28 that detects the current of the motor 7.

In the present embodiment, in the electric brake device having the premise configuration as described above, the motor control section 15 is configured to be provided with a positive efficiency operation limiter 22, a light braking-time non-execution section 25, a motor temperature-corresponding execution section 26, and a vehicle speed-corresponding execution section 27 that will be described below. The positive efficiency operation limiter 22 includes a braking force-corresponding limitation degree change section 23 and a temperature-corresponding limitation degree change section 24.

The positive efficiency operation limiter 22 provides a time for maintaining or decreasing a torque to be generated by the motor 7, according to a determined condition such that a braking force generated by pressing between the brake rotor 4 and the friction pad 6 does not decrease, while the braking force command value outputted from the braking force command section 12 increases. The determined condition is, for example, to limit the ratio of a time for increasing the braking force, relative to the sum of the time for increasing the braking force and the time for maintaining or decreasing the braking force, to a predetermined value or less. Specifically, the positive efficiency operation limiter 22 operates to provide the time for maintaining or decreasing the torque, according to the determined condition such that the braking force does not decrease as described above, for example, using a LUT implemented by software or hardware and a predetermined transform function and a predetermined comparison function contained in a library of software, or hardware equivalent to those, etc., by setting of later-described predetermined values α and β and set value x, etc., while the braking force command value increases.

Figure 3:
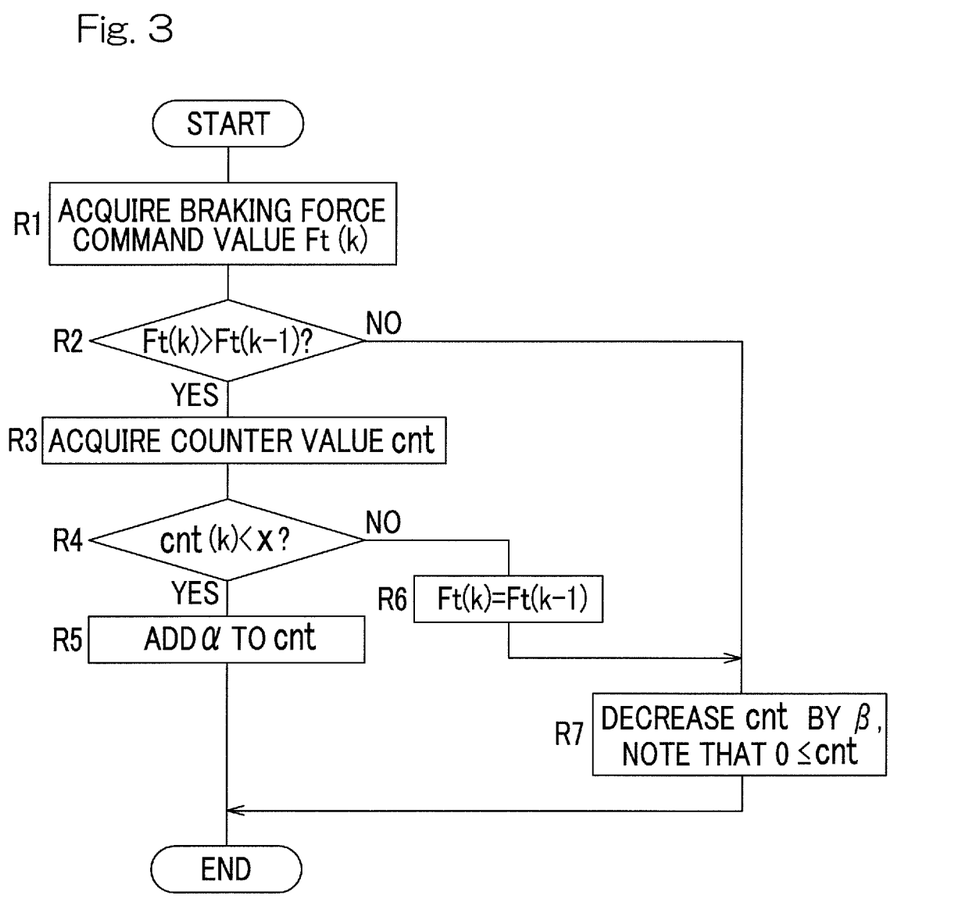
FIG. 3 is a flowchart showing an example of a processing method of a positive efficiency operation limiter in the electric brake device.
Figure 4:
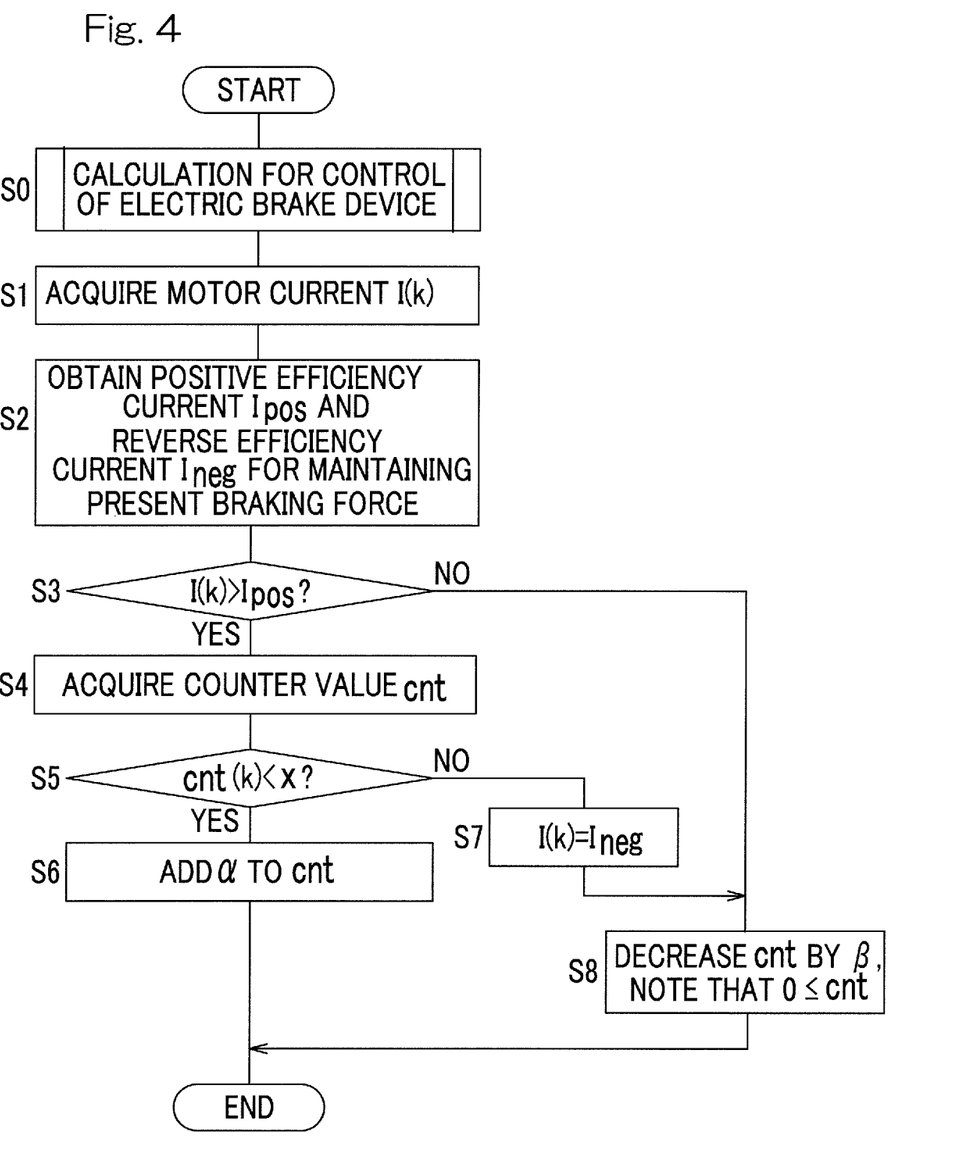
FIG. 4 is a flowchart showing another example of the processing method of the positive efficiency operation limiter in the electric brake device.

More specifically, the positive efficiency operation limiter 22 performs control shown by a flowchart in FIG. 3 or control shown by a flowchart in FIG. 4, as basic control thereof. Although the control in each drawing will be described specifically later, a schematic description of the control in each drawing is as follows. The control shown in FIG. 3 is control in which an output time during which the braking force command value is outputted from the braking force command section 12 is counted, and the ratio of the time for increasing the braking force relative to the sum is limited to the predetermined value or less in accordance with the count value. The control shown in FIG. 4 is control in which a motor current calculated by the basic control section 21 or a motor current detected by the current detector 28 is compared with a positive efficiency current for maintaining the present braking force, a time during which the calculated or measured current is larger than the positive efficiency current is counted, and the ratio of the time for increasing the braking force relative to the sum is limited to the predetermined value or less in accordance with the count value.

The light braking-time non-execution section 25 executes the positive efficiency operation limiter 22 only when the braking force command value outputted by the braking force command section 12 is equal to or greater than a predetermined value. The predetermined value is set to a value as appropriate. Specifically, the light braking-time non-execution section 25 is, for example, a comparator configured by using, for example, a LUT implemented by software or hardware and a predetermined comparison function contained in a library of software, or hardware equivalent to those, etc., and outputs a permission signal for the above execution only when the braking force command value is equal to or greater than the predetermined value.

The motor temperature-corresponding execution section 26 executes the positive efficiency operation limiter 22 when a motor temperature obtained by motor temperature estimation section 29 becomes equal to or higher than a predetermined value. Specifically, the motor temperature-corresponding execution section 26 is such as a comparator configured by using, for example, a LUT implemented by software or hardware and a predetermined comparison function contained in a library of software, or hardware equivalent to those, etc., and outputs a permission signal for the above execution when the motor temperature is equal to or higher than the predetermined value. The motor temperature estimation section 29 estimates the temperature of the motor 7 from a certain detection value or the like, or actually measures the temperature of the motor 7, such as a thermometer. The motor temperature estimation section 29 is, for example, a temperature sensor, a digital to analog converter (DAC) that converts an analogue detection value of a temperature sensor into a digital value, or calculates the motor temperature from the motor current value or the like by using a LUT implemented by software or hardware and a predetermined transform function contained in a library of software, or hardware equivalent to those, etc.

The vehicle speed-corresponding execution section 27 causes the control performed by the positive efficiency operation limiter 22 only when a vehicle speed estimated or measured by vehicle speed estimation section 30 is equal to or lower than a constant value. Specifically, the vehicle speed-corresponding execution section 27 is, for example, a comparator configured by using, for example, a LUT implemented by software or hardware and a predetermined comparison function contained in a library of software, or hardware equivalent to those, etc., and outputs a permission signal for causing the control to be performed, only when the vehicle speed is equal to or lower than the constant value. The vehicle speed estimation section 30, for example, estimates the vehicle speed from a detection value of a rotation speed of a driven wheel of the vehicle, or directly detects the vehicle speed. The vehicle speed estimation section 30 is, for example, a speed meter, a DAC that converts an analog detection value of a speed meter into a digital value, or a section that calculates the vehicle speed from a rotation detection value of a rotary encoder or the like by using a LUT implemented by software or hardware and a predetermined transform function contained in a library of software, or hardware equivalent to those, etc.

The braking force-corresponding limitation degree change section 23 decreases a ratio of a time for increasing the braking force relative to a sum of the time for increasing the braking force and the time for maintaining or decreasing the braking force, as the braking force increases. The braking force used in the braking force-corresponding limitation degree change section 23 is, for example, a braking force estimated by a braking force estimation section 32 provided in the motor control section 15. The braking force-corresponding limitation degree change section 23 decreases the ratio of the time for increasing the braking force relative to the sum, in accordance with increase of the braking force by using a LUT implemented by software or hardware and a predetermined transform function contained in a library of software, or hardware equivalent to those, etc.

The braking force estimation section 32 estimates a braking force generated by pressing between the brake rotor 4 and the friction pads 5 and 6. The braking force estimation section 32 obtains an appropriate braking force, for example, from the braking force command value outputted by the braking force command section 12 and the motor current detected by the current detector 28, by calculation using a LUT implemented by software or hardware and a predetermined transform function contained in a library of software, or hardware equivalent to those, etc. The relationship between the braking force command value, the motor current, and the estimated value of the braking force is defined in advance on the basis of results of an experiment, simulation, or the like, and is set, for example, in a form of a LUT or the like in the braking force command section 12. Other than the above, the braking force estimation section 32 may use a detection value of a load sensor (not shown) that detects an axial load on the conversion mechanism 9.

Next, operations by the above configuration will be described. When the brake operation portion 13 such as a brake pedal is operated, the operation amount thereof is detected by the sensor 13a, and a braking force command value corresponding to the operation amount is outputted from the braking force command section 12 of the ECU 11. Basically, the brake controller 2 outputs, with the basic control section 21, a current command corresponding to the braking force command value, to the power circuit section 14 to drive the motor 7, thereby pressing the friction pad 6 against the brake rotor 4 to generate a braking force.

At this time, the positive efficiency operation limiter 22 provides a time for maintaining or decreasing the torque to be generated by the motor 7, for example, even when the braking force command value increases, by limiting a time during which the electric brake device operates on the basis of positive efficiency, thereby reducing maximum power consumption and motor heat generation at any operation request. A process of limiting the time, during which the electric brake device operates, on the basis of positive efficiency is defined, for example, as a process of limiting the ratio of the time for increasing the braking force, relative to the sum of the time for increasing the braking force and the time for maintaining or decreasing the braking force, to the predetermined value or less.

Figure 2A:
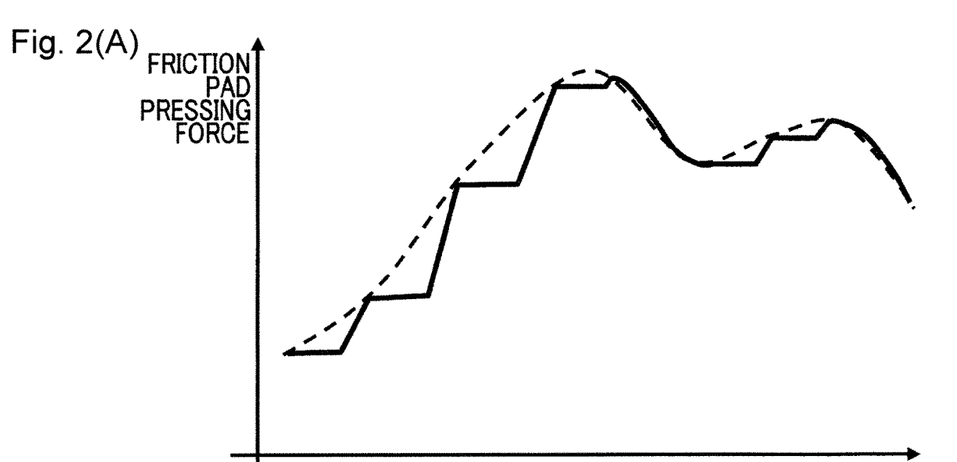
FIGS. 2(A) and 2(B) are graphs showing change of a pressing force of a friction pad and change of motor copper loss in the electric brake device.
Figure 2B:
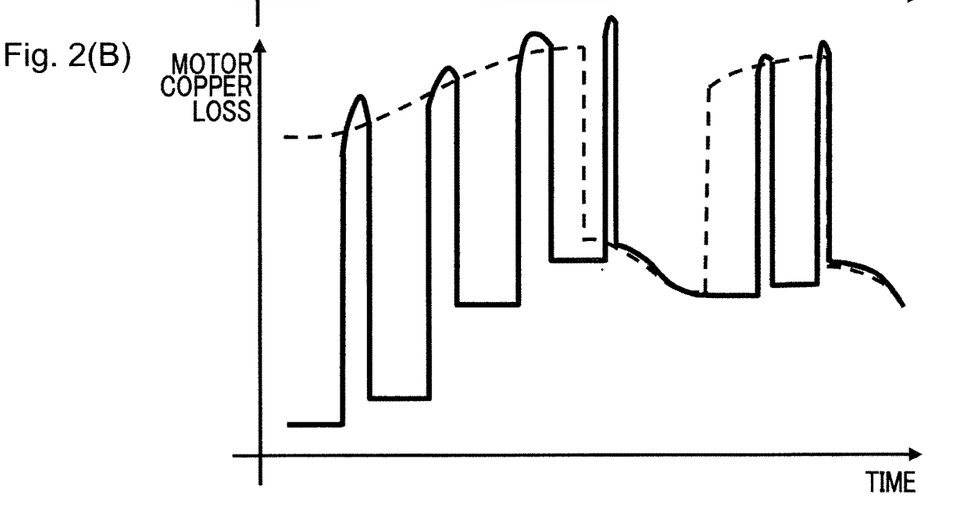

In FIG. 2(A), the diagram shows an example of an operation of varying the pressing force of the friction pad 6 (vertical axis) over time (horizontal axis) in the electric brake device, and in FIG. 2(B), the diagram shows transition of motor copper loss in this case (vertical axis) over time (horizontal axis). In each of the diagrams of FIG. 2(A) and FIG. 2(B), the dotted line shows the case of following the braking force command value without any error as in the conventional art, and the solid line shows the case of limiting the time during which the positive efficiency operation shown by the straight line (1) in FIG. 5 is performed as in the present embodiment. When the friction pad pressing force does not change at the solid line in the diagram of FIG. 2(A), the motor copper loss decreases as shown by the solid line in the diagram of FIG. 2(B) by decreasing the motor torque such that the motor torque does not fall below the reverse efficiency line shown by the straight line (2) in FIG. 5. The motor torque that does not fall below the reverse efficiency line can be obtained, for example, by analyzing or measuring in advance a correlation between the torque and the pressing force of the conversion mechanism 9. Controlling of decreasing the motor torque such that the motor torque does not fall below the reverse efficiency line can be achieved by setting the motor torque obtained thus in the positive efficiency operation limiter 22.

When the operation of the electric brake device deviates from a request as shown in the diagram of FIG. 2(A), there is a possibility that the feeling of the operator of the vehicle equipped with the electric brake device deteriorates. Thus, the following countermeasure is also taken in the present embodiment.

The light braking-time non-execution section 25 executes positive efficiency operation limitation by the positive efficiency operation limiter 22 only when the braking force command value, which is a requested braking force, is equal to or greater than a predetermined value. It is thought that the positive efficiency operation limitation becomes more effective as the braking force, that is, the pad pressing force, increases, and, in general, influence on deterioration of the feeling of the operator becomes smaller as deceleration of the vehicle increases. Thus, both desired power consumption and desired feeling can be achieved by executing the positive efficiency operation limitation only when the braking force command value is equal to or greater than the predetermined value.

In this case, the braking force-corresponding limitation degree change section 23 may be configured to decrease the ratio of the time for increasing the braking force relative to the sum as the braking force increases. Accordingly, both desired power consumption and desired feeling can be achieved further favorably.

The motor temperature-corresponding execution section 26 monitors the motor temperature of the electric brake device, and executes the positive efficiency operation limitation by the positive efficiency operation limiter 22 when the motor temperature becomes equal to or higher than a predetermined value. That is, feeling is prioritized when the temperature of the motor is low, and power consumption is reduced as the temperature increases, thereby suppressing motor heat generation. In general, in the case where motor copper loss is a problem as power consumption of the vehicle, it is thought that corresponding loss occurs in the motor to generate heat. Thus, also in this method, both desired power consumption and desired feeling can be achieved.

In this case, when the temperature-corresponding limitation degree change section 24 is configured to decrease the ratio of the time for increasing the braking force as the motor temperature increases, both desired power consumption and desired feeling can be achieved further favorably. The temperature-corresponding limitation degree change section 24 decreases the ratio of the time for increasing the braking force, in accordance with increase of the motor temperature by using a LUT implemented by software or hardware and a predetermined transform function contained in a library of software, or hardware equivalent to those, etc.

The vehicle speed-corresponding execution section 27 executes the positive efficiency operation limitation by the positive efficiency operation limiter 22 only when the speed of the vehicle is equal to or lower than a predetermined value. In the case of performing such control, particularly when the vehicle has stopped or is at stoppage, the above feeling deterioration does not occur. Any one of the light braking-time non-execution section 25, the motor temperature-corresponding execution section 26, and the vehicle speed-corresponding execution section 27 may be selectively used, or any two of them may be used in combination, or all of them may be used in combination.

An example of a basic process performed by the positive efficiency operation limiter 22 will be described with reference to FIG. 3. The example in FIG. 3 is an example in which limitation is performed on the basis of the braking force command value. A braking force command value Ft(k) is acquired from the braking force command section 12 (step R1) and is compared with a braking force command value Ft(k−1) acquired last time (step R2). When the braking force command value Ft(k) has not increased from the last braking force command value FT(k−1) ("no" in step R2), a value cnt of a counter CN (FIG. 1) is changed to a value obtained by decreasing the value cnt by a predetermined value β (step R7). The counter value cnt is defined to satisfy 0≤cnt, and is set to 0 when the counter value cnt becomes negative as a result of the decrease by β in the process in step R7.

The counter is provided in the positive efficiency operation limiter 22 in order to determine the ratio in the positive efficiency operation limitation. The value β and a later-described value α are arbitrarily set for determining the ratio in the positive efficiency operation limitation. As an example, the value α is set to 4, and the value β is set to 1. These values α and β may be varied by an operation of appropriate input means or the like connected to the brake controller 2 or the ECU 11.

After the counter decrease in step R7, the process is ended, that is, a return is made. After the return, similarly to last time or the process mentioned above, a braking force command value Ft(k) is acquired (step R1) and is compared with a braking force command value Ft(k−1) (step R2). When the braking force command value Ft(k) has not increased, the process in step R7 is performed, then a return is made, and a braking force command value Ft(k) is acquired again (step R1). When the braking force command value Ft(k) has increased as a result of the determination in step R2 ("yes" in step R2), the value cnt of the counter is acquired (step R3) and is compared to a set value x for determination (step R4). The set value x may be arbitrarily set in consideration of the values α and β. For example, when the value x is set to 2, since the counter value cnt is presently set to 0 as a result of the last process in step R7, the condition of cnt (=0)<x (=2) is satisfied, and the process proceeds to step R5 in a direction of "yes" branch. Here, α is added to the counter value cnt, and a return is made. When α=4, the present counter value cnt is a result of 0+4, that is, 4.

After the return, similarly to last time, a braking force command value Ft(k) is acquired (step R1) and is compared to a braking force command value Ft(k−1) (step R2). When the braking force command value Ft(k) has increased, the value cnt of the counter is acquired (step R3) and is compared with the set value x (step R4). Since, presently, cnt=4 and x=2, the condition of cnt<x is not satisfied ("no" in step R4). In this case, the process proceeds to step R6. In step R6, the braking force command value Ft(k) is changed to the braking force command value Ft(k−1) acquired last time, and control of a command to output a motor current by the basic control section 21 is caused to be performed. That is, even when the braking force command value Ft(k) has increased, the command value of the motor current to be outputted from the basic control section 21 is maintained at a value that is equal to the last value. While the limitation by the positive efficiency operation limiter 22 is not performed, the basic control section 21 outputs the command value of the motor current in accordance with the braking force command value Ft(k) outputted from the braking force command section 12. After the change of the braking force command value Ft(k) to the braking force command value Ft(k−1) acquired last as described above, the process proceeds to step R7, the counter value cnt is decreased by β, and a return is made. When β is 1, the present counter value cnt is changed from the above 4 to 3.

After the return, similarly to last time, a braking force command value Ft(k) is acquired (step R1) and is compared to a braking force command value Ft(k−1) (step R2). When the braking force command value Ft(k) has increased, the value cnt of the counter is acquired (step R3) and is compared to the set value x (step R4). Since, presently, cnt=4 and x=2, the condition of cnt<x is not satisfied, the process proceeds to step R6, the braking force command value Ft(k) is maintained as the braking force command value Ft(k−1) acquired last time, the counter value cnt is decreased by β (step R7), and a return is made. As described above, even when the braking force command value Ft(k) outputted from the braking force command section 12 has increased, control in which the command value of the motor current to be sent from the basic control section 21 is maintained constant is performed.

The counter value cnt is decreased by β each time the process of maintaining the braking force command value Ft(k) as the braking force command value Ft(k−1) acquired last time (step R6) is performed. Thus, when the braking force command value Ft(k) outputted from the braking force command section 12 has continuously increased, the counter value cnt satisfies cnt<x as a result of the determination in step R4, and the process proceeds to the "yes" branch, so that the process of maintaining the braking force command value Ft(k) as the braking force command value Ft(k−1) acquired last time in step R6, that is, the positive efficiency operation limitation, is not performed. At this time, the basic control section 21 outputs a command of the motor current corresponding to the braking force command value Ft(k) outputted from the braking force command section 12.

At this time, α is added to the counter value cnt, and then a return is made. Thus, when the braking force command value Ft(k) outputted from the braking force command section 12 has continuously increased, the process proceeds to the "no" branch again as a result of the determination with the set value x in step R4, and the process of maintaining the braking force command value Ft(k) as the braking force command value Ft(k−1) acquired last time (step R6) is performed. However, during a period from a time of completion of the last determination with the set value x in step R4 to a time when the process of maintaining the last braking force command value Ft(k−1) (step R6) is performed through the same determination in step R4 above, the braking force command value Ft(k) to be outputted from the braking force command section 12 is maintained, that is, positive efficiency operation is performed.

By setting the values α and β to appropriate values as described above, a control with the ratio in the positive efficiency operation limitation being determined can be performed. For example, when the value α is set to 4 and the value β is set to 1, the ratio of a time for performing positive efficiency operation relative to the full operation time is limited to 20% or less. Even when α and β are fixed, the ratio changes depending on the value of the threshold x, and the ratio varies also depending on the state of the counter. At this time, for example, by setting α to a common multiple of β (or vice versa) and satisfying 0<x≤β, the ratio between α and β obviously becomes roughly the positive efficiency operation limitation ratio and thus becomes a parameter that is easy to understand. In addition, for example, an increase/decrease range of cnt may be fixed as 1, and a flow of control may be provided in which an authority to shift to the flow corresponding to "no" branch in step R4 in FIG. 3 and to clear cnt in this flow corresponding to this "no" branch when the condition of cnt>α is satisfied, is obtained, and an authority to shift to the flow corresponding to "yes" branch in step R4 in FIG. 3 when the condition of cnt>β is satisfied, is obtained. In this case, the relation between α and β obviously become equal to the positive efficiency operation limitation ratio.

Another example of the basic process performed by the positive efficiency operation limiter 22 will be described with reference to FIG. 4. The example in FIG. 4 is an example in which limitation is performed on the basis of the motor current. The basic control section 21 of the electric brake device calculates a motor current I(k) corresponding to the braking force command value sent from the braking force command section 12, and outputs the motor current I(k) to the power circuit section 14 (step S0). The positive efficiency operation limiter 22 acquires the value of the calculated motor current I(k) (step S1), and obtains a positive efficiency current $I_{pos}$ and a reverse efficiency current $I_{neg}$ required for maintaining the present braking force, by using a calculation formula or a table (not shown) set in the positive efficiency operation limiter 22 (step S2). The table or the calculation formula is created in advance by simulation or an experiment.

The motor current I(k) calculated as described above and the required positive efficiency current $I_{pos}$ are compared to each other (step S2). When the motor current I(k) is not larger than the positive efficiency current $I_{pos}$ as a result of the comparison ("no" in step S3), a value cnt of a counter (not shown) is changed to a value obtained by decreasing the value cnt by a predetermined value β (step S8). The counter value cnt is defined to satisfy 0≤cnt, and is set to 0 when the counter value cnt becomes negative as a result of the decrease by β in the process in step S8.

The counter is provided in the positive efficiency operation limiter 22 in order to determine the ratio in the positive efficiency operation limitation. The value β and a later-described value α are arbitrarily set for determining the ratio in the positive efficiency operation limitation. As an example, the value α is set to 4, and the value β is set to 1.

These values α and β may be varied by an operation of appropriate input means provided to the brake controller 2 or the ECU 11, etc.

After the counter decrease in step S8, the process is ended, that is, a return is made. After the return, similarly to last time, a motor current I(k) is calculated (step S0), the motor current I(k) is acquired (step S1), a positive efficiency current $I_{pos}$ and a reverse efficiency current $I_{neg}$ required for maintaining the braking force are calculated (step S2), and the motor current I(k) and the positive efficiency current $I_{pos}$ are compared to each other (step S3). When the motor current I(k) is not larger, the process in step S8 is performed, then a return is made, and the processes in steps S0 to S3 are performed again.

When the motor current I(k) is larger than the positive efficiency current $I_{pos}$ as a result of the determination in step S3 ("yes" in step S3), the value cnt of the counter is acquired (step S4) and is compared to a set value x for determination (step S5). The set value x may be arbitrarily set in consideration of the values α and β. For example, when the value x is set to 2, since the counter value cnt is presently set to 1 as a result of the last process in step S8, the condition of cnt (=0)<x (=2) is satisfied, and the process proceeds to step S6 in a direction of "yes" branch. Here, α is added to the counter value cnt, and a return is made. When α=4, the present counter value cnt is a result of 0+4 and thus is 4.

After the return, similarly to last time, a motor current I(k) is calculated (step S0), the motor current I(k) is acquired (step S1), a positive efficiency current $I_{pos}$ and a reverse efficiency current $I_{neg}$ required for maintaining the braking force are calculated (step S2), and the motor current I(k) and the positive efficiency current $I_{pos}$ are compared to each other (step S3). When the motor current I(k) is larger, the value cnt of the counter is acquired (step S4) and is compared to the set value x (step S5). Since, presently, cnt=4 and x=2, the condition of cnt<x is not satisfied ("no" in step S5). In this case, the process proceeds to step S7. In step S7, the motor current I(k) is changed to the reverse efficiency current $I_{neg}$, and the motor current to be outputted by the basic control section 21 is set to the reverse efficiency current $I_{neg}$. That is, even when the motor current I(k) has increased, the command value of the motor current to be outputted from the basic control section 21 is set to the reverse efficiency current $I_{neg}$. While the limitation by the positive efficiency operation limiter 22 is not performed, the basic control section 21 outputs the motor current I(k) in accordance with the braking force command value Ft(k) outputted from the braking force command section 12. After the motor current I(k) is changed to the reverse efficiency current $I_{neg}$ as described above, the process proceeds to step S8, the counter value cnt is decreased by β, and a return is made. When β is 1, the present counter value cnt is changed from the above 4 to 3.

After the return, similarly to last time, the processes in steps S0 to S2 are performed, and a motor current I(k) and a positive efficiency current $I_{pos}$ are compared to each other (step S2). When the motor current I(k) is larger, the value cnt of the counter is acquired (step S4) and is compared to the set value x (step S5). Since, presently, cnt=3 and x=2, the condition of cnt<x is not satisfied, the process proceeds to step S7, the motor current I(k) is decreased to the reverse efficiency current $I_{neg}$, the counter value cnt is decreased by β (step S8), and a return is made. As described above, control in which the motor current I(k) is decreased to the reverse efficiency current $I_{neg}$ for maintaining the present braking force is performed.

The counter value cnt is decreased by β (step S8) each time the process of decreasing the motor current I(k) to the reverse efficiency current $I_{neg}$ (step S7) is performed. Thus, when the braking force command value Ft(k) outputted from the braking force command section 12 has continuously increased so that decrease to the reverse efficiency current $I_{neg}$ has continued, the counter value cnt satisfies the condition of cnt<x as a result of the determination in step S5, and the process proceeds to the "yes" branch, so that the process of decreasing the motor current I(k) in step S7, that is, the positive efficiency operation limitation, is not performed. At this time, the basic control section 21 outputs a command of the motor current I(k) corresponding to the braking force command value Ft(k) outputted from the braking force command section 12.

At this time, α is added to the counter value cnt, and then a return is made. Thus, when the braking force command value Ft(k) outputted from the braking force command section 12 has continuously increased, the process proceeds to the "no" branch again as a result of the determination with the set value x in step S5, and the process of decreasing the motor current I(k) to the reverse efficiency current $I_{neg}$ (step S7) is performed. However, during a period from a time of completion of the last determination with the set value x in step S5 to a time when the process of decreasing to the reverse efficiency current $I_{neg}$ is performed through the same determination in step S5 above, the motor current I(k) corresponding to the braking force command value Ft(k) outputted from the braking force command section 12 is maintained, that is, positive efficiency operation is performed.

In this case as well, by setting the values α and β to appropriate values as described above, a control with the ratio in the positive efficiency operation limitation being determined can be performed. For example, when the value α is set to 4 and the value β is set to 1, the ratio of a time for performing positive efficiency operation relative to the full operation time is limited to 20% or less. In addition, in the case of the control according to this flowchart, since the motor current I(k) is decreased to the reverse efficiency current $I_{neg}$, the saving efficiency of the motor current further improves in comparison with the control in FIG. 3 in which the present state is maintained.

As described above, according to each embodiment described above, the current is decreased by using the frictional force to maintain the pressing force of the conversion mechanism 9, thereby allowing the power consumption to be reduced by reducing loss caused by conductor resistance. In addition, motor heat generation is suppressed by a reduction in the motor current, so that improvement of the reliability and size reduction of the motor are enabled.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

3 . . . wheel
4 . . . brake rotor 5, 6 . . . friction pad
7 . . . motor
8 . . . speed reduction mechanism
9 . . . conversion mechanism
11 . . . ECU
12 . . . braking force command section
22 . . . positive efficiency operation limiter
23 . . . braking force-corresponding limitation degree change section
24 . . . temperature-corresponding limitation degree change section
25 . . . light braking-time non-execution section
26 . . . motor temperature-corresponding execution section
27 . . . vehicle speed-corresponding execution section

What is claimed is:

1. An electric brake device comprising:
a brake rotor configured to rotate in conjunction with a wheel;
a friction pad configured to come into contact with the brake rotor to generate a braking force;
an electric motor;
a conversion mechanism configured to convert an output of the electric motor into a pressing force of the friction pad;
a braking force command section configured to output a braking force command value that is a target value;
a brake controller configured to drive the electric motor in accordance with the braking force command value;
a vehicle speed estimation section configured to estimate or measure a vehicle speed of a vehicle equipped with the electric brake device; and
a vehicle speed-corresponding execution section configured to cause a control by a positive efficiency operation limiter to be performed only when the vehicle speed estimated or measured by the vehicle speed estimation section is equal to or lower than a constant value,
wherein
the brake controller is provided with the positive efficiency operation limiter configured to provide a time for maintaining or decreasing a torque to be generated by the electric motor, according to limiting a ratio of a time for increasing the braking force, relative to a sum of the time for increasing the braking force and the time for maintaining or decreasing the braking force, to a predetermined value or less such that a braking force generated by pressing between the brake rotor and the friction pad does not decrease, while the braking force command value outputted from the braking force command section increases,
wherein the positive efficiency operation limiter is configured to:
obtain a motor current and a positive efficiency current value,
compare the motor current with the positive efficiency current value,
when the motor current is less than the positive efficiency current value, decrease a counter value by a first predetermined amount, and obtain the motor current again;
when the motor current is greater than the positive efficiency current value, obtain the counter value and determine whether the counter value is less than a set value, and
when the counter value is less than the set value, increase the counter value by a second predetermined amount,
wherein the first predetermined amount and the second predetermined amount are set so as to determine a ratio in an operation of the positive efficiency operation limiter.

2. The electric brake device as claimed in claim 1, wherein the positive efficiency operation limiter compares the motor current with a positive efficiency current value for maintaining a present braking force, counts a time during which the motor current is larger than the positive efficiency current value, and limits the ratio of the time for increasing the braking force relative to the sum, to the predetermined value or less in accordance with the count value.

3. The electric brake device as claimed in claim 1, further comprising a light braking-time non-execution section configured to execute the positive efficiency operation limiter only when the braking force command value outputted by the braking force command section is equal to or greater than a predetermined value.

4. The electric brake device as claimed in claim 1, further comprising a braking force-corresponding limitation degree change section configured to decrease a ratio of a time for increasing the braking force relative to a sum of the time for increasing the braking force and the time for maintaining or decreasing the braking force, as the braking force increases.

5. The electric brake device as claimed in claim 1, wherein the positive efficiency operation limiter is configured to:
obtain a reverse efficiency current value, and
when the counter value is greater than the set value, change the motor current to the reverse efficiency current value such that the motor current to be outputted is set to the reverse efficiency current value to maintain a present braking force, decrease the counter value by the first predetermined amount, and obtain the motor current again.

6. The electric brake device as claimed in claim 1, further comprising:
a motor temperature estimation section configured to estimate or measure a temperature of the electric motor; and
a motor temperature-corresponding execution section configured to execute the positive efficiency operation limiter when the temperature of the electric motor becomes equal to or higher than a predetermined value.

7. The electric brake device as claimed in claim 6, wherein the positive efficiency operation limiter is provided with a temperature-corresponding limitation degree change section configured to decrease a ratio of a time for increasing the braking force relative to a sum of the time for increasing the braking force and the time for maintaining or decreasing the braking force, as the temperature of the electric motor increases.

* * * * *